United States Patent
Nakanishi

(10) Patent No.: US 9,986,726 B2
(45) Date of Patent: Jun. 5, 2018

(54) FISHING LINE OF CORE-SHEATH STRUCTURE COMPRISING SHORT FIBER

(75) Inventor: Shigeru Nakanishi, Hyogo (JP)

(73) Assignee: Y. G. K Co., Ltd., Hyogo (JP)

(*) Notice: Subject to any disclaimer, the term of this patent is extended or adjusted under 35 U.S.C. 154(b) by 980 days.

(21) Appl. No.: 12/922,514

(22) PCT Filed: Mar. 2, 2009

(86) PCT No.: PCT/JP2009/053820
§ 371 (c)(1),
(2), (4) Date: Sep. 14, 2010

(87) PCT Pub. No.: WO2009/116381
PCT Pub. Date: Sep. 24, 2009

(65) Prior Publication Data
US 2011/0020645 A1 Jan. 27, 2011

(30) Foreign Application Priority Data
Mar. 17, 2008 (JP) .................... 2008-068539

(51) Int. Cl.
*A01K 91/00* (2006.01)
*D02G 3/36* (2006.01)
*D02G 3/04* (2006.01)
*D04C 1/12* (2006.01)
*D02G 3/44* (2006.01)

(52) U.S. Cl.
CPC .......... *A01K 91/00* (2013.01); *D02G 3/36* (2013.01); *D02G 3/444* (2013.01); *D04C 1/12* (2013.01); *D07B 2201/209* (2013.01); *D07B 2401/205* (2013.01); *D07B 2501/2038* (2013.01); *Y10T 428/2904* (2015.01); *Y10T 428/2933* (2015.01)

(58) Field of Classification Search
None
See application file for complete search history.

(56) References Cited

U.S. PATENT DOCUMENTS

| | | | | | |
|---|---|---|---|---|---|
| 2,638,634 | A | * | 5/1953 | Hare | 19/0.37 |
| 3,250,602 | A | * | 5/1966 | Stalego | 65/438 |
| 3,477,218 | A | * | 11/1969 | Field et al. | 57/289 |
| 3,631,666 | A | * | 1/1972 | Kim | 57/6 |
| 4,302,925 | A | * | 12/1981 | Edagawa et al. | 57/6 |
| 4,307,566 | A | * | 12/1981 | Murata et al. | 57/228 |
| 4,505,100 | A | * | 3/1985 | Yoshiyuki et al. | 57/207 |
| 5,497,608 | A | * | 3/1996 | Matsumoto et al. | 57/207 |
| 5,881,492 | A | | 3/1999 | Abiru et al. | |
| 6,477,740 | B1 | * | 11/2002 | Hansen | 19/0.35 |
| 6,497,951 | B1 | * | 12/2002 | DeAngelis et al. | 428/364 |
| 6,841,243 | B2 | * | 1/2005 | Tokarsky et al. | 428/364 |
| 7,081,298 | B2 | * | 7/2006 | Nakanishi | 428/394 |
| 7,349,756 | B2 | * | 3/2008 | Scott et al. | 700/144 |
| 7,395,654 | B2 | * | 7/2008 | Takiue | 57/210 |
| 7,454,816 | B2 | * | 11/2008 | Popper et al. | 19/0.35 |
| 8,022,160 | B2 | * | 9/2011 | Dirks et al. | 526/348.1 |
| 8,022,171 | B2 | * | 9/2011 | Goossens et al. | 528/502 B |
| 2003/0082381 | A1 | * | 5/2003 | Nakanishi | A01K 91/00 428/375 |
| 2003/0205041 | A1 | * | 11/2003 | Baker, Jr. | 57/224 |
| 2004/0025486 | A1 | * | 2/2004 | Takiue | 57/224 |
| 2004/0058152 | A1 | * | 3/2004 | Tokarsky et al. | 428/373 |
| 2006/0154065 | A1 | | 7/2006 | Bloch | |
| 2007/0269654 | A1 | * | 11/2007 | Veillat et al. | 428/364 |
| 2009/0012251 | A1 | * | 1/2009 | Dirks et al. | 526/352 |
| 2009/0115099 | A1 | * | 5/2009 | Goossens et al. | 264/290.5 |
| 2011/0020645 | A1 | * | 1/2011 | Nakanishi | 428/359 |
| 2011/0173873 | A1 | * | 7/2011 | Nakanishi | A01K 91/00 43/44.98 |

FOREIGN PATENT DOCUMENTS

| | | | |
|---|---|---|---|
| JP | 0790740 | * | 4/1995 |
| JP | 9-3742 | | 1/1997 |
| JP | H11103737 | * | 4/1999 |
| JP | 2001-64839 | | 3/2001 |
| JP | 2001-148982 | | 6/2001 |
| JP | 2006-314324 | | 11/2006 |
| JP | 2007-135500 | | 6/2007 |
| JP | 2009084726 A | * | 4/2009 |
| WO | 2005/001177 | | 1/2005 |

OTHER PUBLICATIONS

Nexis Fibers, 2013.*
Fiber and Fabric Properties, 2005.*
Machine translation of JP 0790740, Koike, Apr. 1995.*
Machine translation of JPH11103737, Konishi et al., Apr. 1999 (Year: 1999).*
Wikipedia (https://en.wikipedia.org/wiki/Polyvinylidene_fluoride, page visited on Oct. 30, 2017 (Year: 2017).*
Wikipedia, (https://en.wikipedia.org/wiki/Ultra-high-molecular-weight polyethylene), page visited on Oct. 30, 2017. (Year: 2017).*
Russian Office Action dated Nov. 16, 2012 corresponding to Russian Application No. 2010142361 with English translation.
Supplementary European Search Report issued Oct. 30, 2013 in corresponding European Application No. 09721555.2.
International Search Report dated Apr. 28, 2009 in International (PCT) Application No. PCT/JP2009/053820.
English translation of the International Preliminary Report on Patentability and Written Opinion dated Nov. 2, 2010.

* cited by examiner

*Primary Examiner* — Shawn Mckinnon
(74) *Attorney, Agent, or Firm* — Wenderoth, Lind & Ponack, L.L.P.

(57) ABSTRACT

A yarn which contains a composite yarn composed of a core part containing a short fiber and a sheath part containing a synthetic fiber filament yarn, the core part and the sheath part being integrated via fluff of the short fiber getting between or entangled with the long fibers, the specific gravity of the yarn being adjustable in the range of 1.0 or more, a fishing line containing the yarn, and a method for producing the fishing line. The present invention provides an ideal fishing line which has a strong core-sheath structure, does not allow separation or detachment of the core part and the sheath part, is easy to handle, and also is excellent in strength, weatherability, and water resistance.

10 Claims, No Drawings

FISHING LINE OF CORE-SHEATH STRUCTURE COMPRISING SHORT FIBER

This application is a U.S. national stage of International Application No. PCT/JP2009/053820 filed Mar. 2, 2009.

TECHNICAL FIELD

The present invention relates to a fishing line having a core-sheath structure comprising a short fiber. In more detail, the present invention relates to a fishing line comprising a composite yarn having a short fiber in a core part and a long fiber in a sheath part.

BACKGROUND ART

In recent years, advancement of fishing lines has been remarkable and fishing lines of different properties tailored to various types of fishing have been developed. Inter alia, braided yarns and covered yarns having a core-sheath structure composed of two or more kinds of fibers including high strength fibers, such as ultra high molecular weight polyethylene fibers, aramid fibers , PBO fibers , polyarylate fibers and glass fibers, have attracted attention because they have high strength, durability and low rate of elongation suitable for easy and correct perception of a fish strike.

Already known as such a fishing line having a core-sheath structure composed of two or more kinds of fibers are as follows: a fishing line which is a covered yarn comprising a synthetic resin multifilament yarn as a core yarn and a twisted synthetic resin multifilament yarn as a sheath yarn wound around the core yarn, the difference between the angle between the core yarn and the sheath yarn and the twist angle of the twisted yarn being 25° or less thereby achieving an excellent breaking strength and knot strength, low rate of elongation and an excellent abrasion resistance (Patent Literature 1); a fishing line comprising a fluorine multifilament fiber as a core yarn and an ultra high molecular weight polyethylene fiber braided around the core yarn, which sinks below water surface, is not easily affected by wind etc., and has a strong abrasion resistance (Patent Literature 2); a yarn comprising a glass fiber core yarn and two or more sheath yarns made of a fiber other than glass fiber, the sheath yarns being braided around the core yarn, the core yarn and the sheath yarns being integrated with a binder resin, the yarn having a rate of elongation of 5% or less (Patent Literature 3).

However, these conventional core-sheath fishing lines do not have sufficient degree of entwinement or binding between the core part and the sheath part. Therefore, such fishing lines have problems that the core part and the sheath part separate from each other and the core yarn slips off, resulting in so-called nude yarn and that friction between the line guide of a fishing rod etc. and the fishing line causes the sheath part to separate and partially form an unorganized mass, so-called nep.

Meanwhile, a fishing line of which the core part and the sheath part are integrated by means of thermal fusion bonding or a binder also has a problem of hardening of the yarn, and resulting curliness and difficulty in handling.

In addition, a fishing line made of an ultrahigh strength fiber, such as an ultra high molecular weight polyethylene filament, has a relatively small specific gravity, and therefore is easily affected by wind or tide. Furthermore, in fast tidal stream or in a deepwater area, it is difficult to quickly and accurately throw the fishing line into a fishable depth range. In recent years, there is a demand from the market for using a fishing line with a specific gravity most suitable for a particular situation, such as in adverse weather conditions or in an area with rapidly changing tidal streams. In this context, development of a yarn with specific gravity of 1.0 or more, preferably adjustable in the range of 1.0 or more, has been desired.

CITATION LIST

[Patent Literature 1] JP-A-09-31786
[Patent Literature 2] JP-A-08-140538
[Patent Literature 3] JP-A-2004-308047

SUMMARY OF INVENTION

Technical Problem

The present inventor wholeheartedly investigated to solve the problems of conventional fishing lines and to develop a yarn having a strong core-sheath structure, which does not develop nude yarn or nep, is easy to handle, and has specific gravity adjustable in the range of 1.0 or more. As a result, the inventor found a surprising fact that adoption of a short fiber is effective to solve the above-mentioned problems of fishing lines sometimes used in a length of hundreds of meters. With further investigations, he finally achieved the present invention.

A first objective of the present invention is to provide an ideal fishing line which has a strong core-sheath structure, does not allow separation or detachment of the core part and the sheath part, is easy to handle, and also is excellent in strength, weatherability, and water resistance.

A second objective of the present invention is to provide a high-value added fishing line which has bendability, flexibility and specific gravity adjustable in the range of 1.0 or more.

A third objective of the present invention is to provide a fishing line which has broad utility and specific gravity adjustable in the range of 1.0 or more.

A fourth objective of the present invention is to provide a fishing line which has a strong and stable core-sheath structure and therefore is resistant to kink, torsion, curliness in a reel, and thread jamming on a spool, achieving easy handling.

In addition, to provide a yarn excellent in robustness, durability, flexibility, etc. and suitable for producing fishing lines, guts, ropes, etc. is also an objective of the present invention.

In addition, to provide, for example, guts, ropes, etc. for tennis, badminton, etc. excellent in robustness, durability, flexibility, etc. is also an objective of the present invention. The other objectives of the present invention will become clear from descriptions in this application.

Solution to Problem

The above-described objectives are achieved by the present invention.

That is, the present invention relates to:
(1) a fishing line comprising a composite yarn having a long fiber in a sheath part and a short fiber in a core part,
(2) the fishing line according to the above (1), wherein single yarns of the short fiber in the core part are overlapped, intertangled or intertwisted,
(3) the fishing line according to the above (1) or (2), wherein the fiber length of the short fiber in the core part is 5 to 500 mm, (4) the fishing line according to any of the above (1) to (3), wherein the specific gravity of the short fiber in the core part is 1.0 or more, (5) the fishing line according to any of the above (1) to (4), wherein the short fiber in the core part is used for adjusting the specific gravity of the fishing line, (6) the fishing line according to any of the above (1) to (5), wherein the short fiber in the core part comprises at least one kind selected from the group consisting of a synthetic fiber, a regenerated fiber, a metal fiber, a ceramic fiber, and a glass fiber, (7) the fishing line according to any of the above (1) to (6), wherein the short fiber in the core part comprises a polyester fiber, a glass fiber, or a fluororesin fiber, (8) the fishing line according to any of the above (1) to (7), wherein the long fiber in the sheath part comprises an ultra high strength fiber, (9) the fishing line according to any of the above (1) to (8), wherein the ultra high strength fiber comprised in the long fiber in the sheath part accounts for 12% by weight or more of the whole composite yarn,

(10) the fishing line according to above (8), wherein the ultra high strength fiber is an ultra high molecular weight polyethylene fiber having a molecular weight of 300,000 or more,

(11) the fishing line according to any of the above (1) to (10), wherein the sheath part is composed of a long fiber braded around the core part,

(12) the fishing line according to any of the above (1) to (10), wherein the sheath part is wound around the core part,

(13) the fishing line according to any of the above (1) to (12), wherein the long fiber in the sheath part and the short fiber in the core part are intertangled,

(14) the fishing line according to any of the above (1) to (13), wherein the outermost layer of the composite yarn or the fishing line composed of a sheath part and a core part is coated with a resin,

(15) the fishing line according to any of the above (1) to (14), which has a history of a drawing treatment under heating or without heating in a production process,

(16) the fishing line according to any of the above (1) to (15), wherein the long fiber comprises an ultra high molecular weight polyethylene fiber and the short fiber comprises a fluororesin fiber,

(17) a method for producing the fishing line according to the above (1), comprising producing a composite yarn with use of a long fiber for the sheath part and another long fiber for the core part, the melting point of the long fiber for the core part being higher than that of the long fiber for the sheath part, and drawing the composite yarn under heating to break the long fiber in the core part into short fiber pieces without breaking the long fiber in the sheath part,

(18) a method for producing the fishing line according to the above (1), comprising producing a composite yarn with use of a long fiber for the sheath part and another long fiber for the core part, the strength of the long fiber for the core part being lower than that of the long fiber for the sheath part , and drawing the composite yarn under heating or without heating to break the long fiber in the core part into short fiber pieces without breaking the long fiber in the sheath part,

(19) the method according to the above (17) or (18), wherein the single-yarn fineness of the short or long fiber constituting the core part is 11 dtex or less,

(20) a method for producing the fishing line according to the above (1), comprising producing a composite yarn with use of a long fiber for the sheath part and a spun yarn comprising a short fiber or staple for the core part, the melting point of the short fiber or staple being higher than that of the long fiber for the sheath part, and drawing the composite yarn under heating or without heating to break the spun yarn into short fiber pieces without breaking the long fiber in the sheath part,

(21) the method according to any of the above (17) to (20), wherein the strength of the long fiber in the sheath part is higher than 8.8 cN/dtex and the strength of the long fiber or spun yarn in the core part is 4.4 cN/dtex or less,

(22) the method according to any of the above (17) to (21), wherein the long fiber comprises an ultra high molecular weight polyethylene fiber and the short fiber comprises a fluororesin fiber,

(23) a yarn comprising a composite yarn having a long fiber in a sheath part and a spun yarn comprising a short fiber in a core part,

(24) the yarn according to the above (23), wherein the long fiber comprises an ultra high molecular weight polyethylene fiber and the short fiber comprises a fluororesin fiber,

(25) a use of a staple for producing the fishing line according to the above (1), and

(26) a yarn comprising a composite yarn composed of a core part comprising a short fiber and a sheath part comprising a synthetic fiber filament yarn, the core part and the sheath part being integrated via fluff of the short fiber getting between or entangled with the long fiber, the specific gravity of the yarn being adjustable in the range of 1.0 or more, and a fishing line comprising the yarn.

Advantageous Effects of Invention

The fishing line of the present invention is a composite yarn composed of a core part comprising a short fiber and a sheath part comprising a long fiber which is preferably a synthetic fiber. At the same time, it is a strong fishing line free from undesirable delamination between the core part and the sheath part which is frequently seen in conventional core-sheath fibers.

The fishing line of the present invention is also excellent in abrasion resistance, and therefore can solve problems of conventional fishing lines in reeling up a fish on a hook, for example surface break of the line due to friction against a guide or other member in contact with the line, or slip.

That is, the fishing line of the present invention is an ideal fishing line which has a strong core-sheath structure, does not allow separation or detachment of the core part and the sheath part, is easy to handle, and also is excellent in strength, weatherability, and water resistance.

In addition, the fishing line of the present invention is excellent in bendability and flexibility, and resistant to kink, torsion, curliness in a reel, and thread jamming on a spool.

Furthermore, the fishing line of the present invention, of which the surface is not sticky, is free from sticking together in a reel or on a bobbin.

Furthermore, the specific gravity of a fishing line taking advantage of the yarn of the present invention can be easily adjusted by appropriately choosing the specific gravity of materials for the short fiber and the long fiber constituting the yarn, the weight ratio of the materials to be used, and the drawing rate of the composite yarn. The specific gravity of an ultra high molecular weight polyethylene fiber, which is a long fiber, is usually less than 1.0. However, if desired, with the use of a short fiber having a specific gravity of 1.0 or more, a fishing line and a yarn having a specific gravity of 1.0 or more can easily be produced.

Furthermore, the present invention provides a yarn excellent in robustness, durability, flexibility, etc. and suitable for producing fishing lines, guts, ropes, etc.

DESCRIPTION OF EMBODIMENTS

The fishing line of the present invention is a composite yarn having a core-sheath structure composed of a core part comprising a fiber having a short fiber length (hereinafter sometimes referred to as a "short fiber") and a sheath part comprising a long fiber (hereinafter sometimes referred to as a "filament yarn") which is preferably a synthetic fiber.

Preferable examples of the long fiber constituting the sheath part of the composite yarn include a filament yarn made of a plurality of at least one kind of filament selected from the group consisting of a monofilament, a multifilament, and a monomultifilament, etc.

Examples of the synthetic fiber used as the long fiber constituting the sheath part of the composite yarn include synthetic fibers made of synthetic resins, such as polyolefin, polyamide, polyester, and polyacrylonitrile resins. The tensile strength of the synthetic fiber determined with a tensile strength tester, for example Strograph R tensile strength tester manufactured by Toyo Seiki Seisaku-Sho, Ltd. according to JIS L 1013 "testing method for man-made filament yarns", is usually higher than about 8.8 cN/dtex, preferably about 17.6 cN/dtex or higher, more preferably about 22.0 cN/dtex or higher, and most preferably about 26.5 cN/dtex or higher. The synthetic long fiber is preferably a monofilament having a fineness of about 11 to 3300 dtex, or a monomultifilament composed of a plurality of monofilaments, preferably about 3 to 50 paralleled monofilaments. Alternatively, the synthetic long fiber is preferably a multifilament composed of a plurality of, preferably about 10 to 600 paralleled monofilaments.

The synthetic long fiber may be composed of a single fiber or two or more kinds of fibers.

The synthetic fiber is preferably an ultra high strength fiber, and examples of the ultra high strength fiber include polyolefin fibers such as ultra high molecular weight polyethylene fibers having a molecular weight of 300,000 or more, preferably 500,000 or more, aromatic polyamide (aramid) fibers, heterocyclic high-function fibers, and all the aromatic polyester fibers. Inter alia, polyolefin fibers such as ultra high molecular weight polyethylene fibers having a molecular weight of 500,000 or more are preferred. More preferred are ultra high molecular weight polyethylene fibers having a molecular weight of 1,000,000 or more. Examples thereof include, besides homopolymers, copolymers with a lower α olefin having about 3 to 10 carbon atoms, such as propylene, butene, pentene, hexene, or the like. In the case of the copolymer of ethylene with the α olefin, the ratio of the latter per 1000 carbon atoms is about 0.1 to 20, preferably about 0.5 to 10 on average. Copolymers having such a ratio show excellent mechanical properties, such as high strength. The method for producing ultra high molecular weight polyethylene is described in, for example, JP-A-55-5228 and JP-A-55-107506.

The synthetic fiber may comprise an ultra high strength fiber and a synthetic fiber other than ultra high strength fibers. The content of the synthetic fiber other than ultra high strength fibers relative to the ultra high strength fiber is about ½ or less, preferably about ⅓ or less, more preferably about ¼ or less by weight.

The ultra high strength fiber used for the composite yarn may be a heterocyclic high-function fiber in which the amide binding site of the above-mentioned aramid fiber is modified to increase elasticity of the aramid fiber. Examples of the heterocyclic high-function fiber include, for example, fibers made of poly-p-phenylene benzobisthiazole (PBZT), poly-p-phenylene benzobisoxazole (PBO), and the like. The heterocyclic high-function fiber can be produced by synthesizing PBZT or PBO resin, dissolving the obtained resin in a suitable solvent, and subsequent dry spinning and drawing. Examples of the solvent include anisotropic liquids, such as methylsulfonic acid, dimethylacetamide-LiCl, and the like.

Since the required strength and specific gravity of such a composite yarn vary with the method of fishing, the ratio of the ultra high strength long fiber in the sheath part relative to the whole composite yarn cannot be simply mentioned. However, higher strength of composite yarns is preferred, which means that a higher ratio of the ultra high strength long fiber is also preferred. The requisite specific gravity of the composite yarn also must be achieved, and therefore, it is preferred to increase the ratio of the ultra high strength long fiber to the extent allowed by the requisite specific gravity. Specifically, the percentage of the ultra high strength long fiber in the sheath part of the composite yarn of the present invention relative to the whole composite yarn is preferably about 12% by weight or more, preferably about 35 to 95% by weight, and most preferably about 60 to 95% by weight.

As the long fiber constituting the sheath part of the present invention, a plurality of monofilaments, multifilaments, or monomultifilaments are used in a paralleled or twisted form. In the case of a twisted yarn, the twist coefficient K is about 0.2 to 1.5, preferably about 0.3 to 1.2, and more preferably about 0.4 to 0.8.

The sheath part of the fishing line of the present invention usually has a structure in which a yarn made of plurality of filaments (long fibers) paralleled or twisted is braided or wound around the core part. In the case of a braided yarn, the braiding angle is preferably about 5° to 90°, more preferably about 5° to 50°, and more preferably about 20° to 30°.

The short fiber constituting the core part of the composite yarn is a short fiber having a fiber length of about 5 to 500 mm, preferably about 10 to 300 mm, and more preferably a short fiber (staple) having a fiber length of about 15 to 200 mm.

The short fiber comprised in the core yarn constituting the core part of the composite yarn preferably has a specific gravity of 1.0 or more. When a long fiber of which the specific gravity is less than about 1.0 is used for the sheath part, using a short fiber of which the specific gravity is about 1.0 or more for the core part enables adjustment of the specific gravity of the composite yarn without limitation to the specific gravity of the material constituting the sheath part. Such a composite yarn is advantageous because the specific gravity of a fishing line can be delicately adjusted depending on the weather or tide.

The short fiber which constitutes the core part of the composite yarn is produced by, for example, cutting a long fiber into pieces of a predetermined length. Also, the short fiber can be produced by various methods: cutting a filament into staples of a predetermined length, twisting staples to form a spun yarn and drawing the yarn to obtain irregularly broken fiber pieces, or drawing a filament yarn, such as a multifilament and monomultifilament to obtain irregularly broken fiber pieces, or the like.

It is more preferred that the short fiber which constitutes the core part forms a plurality of single yarns and that the yarns are arranged in a staple-like form, sequentially arranged in a longitudinal direction, intertangled or intertwisted inside the sheath part. Inter alia, preferred is a fishing line of which the single yarns as the short fiber form a cotton-like material inside the sheath part. Such a fishing line is excellent in flexibility. The short fiber is preferably continuous inside the sheath part.

The short fiber which constitutes the core part of the fishing line may be a synthetic fiber made of a synthetic resin, for example, polyolefin fiber, such as polyethylene or polypropylene; polyamide fiber, such as nylon 6, nylon 66; polyester fiber, such as polyethylene terephthalate; fluororesin fiber, such as polytetrafluoroethylene; polyacrylonitrile fiber; polyvinyl alcohol fiber, or made up of at least one kind selected from the group consisting of a regenerated fiber, such as rayon or acetate; a metal fiber, such as iron, copper, zinc, tin, nickel, or tungsten; a ceramic fiber; a glass fiber, and the like. Examples of the glass fiber include so-called E-glass excellent in electric and mechanical properties, C-glass excellent in chemical resistance, ECR-glass obtained by reducing the alkali content of C-glass and adding titanium and zinc flux thereto, and also A-glass, L-glass, S-glass, and YM31-A-glass. Inter alia, the glass fiber used by the present invention is preferably a glass free from boron oxide and fluorine, and has a composition represented by $SiO_2$—$TiO_2$—$Al_2O_3$—RO (R is a divalent metal, such as Ca and Mg) or $SiO_2$—$Al_2O_3$—RO (R is the same as above).

Examples of the above-mentioned fluororesin polymer, which usually means a fiber obtained from a resin having a fluorine atom in the molecule, include polytetrafluoroethylene (PTFE), the copolymer of ethylene tetrafluoride and perfluoroalkyl vinyl ether (PFA), the copolymer of tetrafluoroethylene and hexafluoropropylene (FEP), the copolymer of ethylene and tetrafluoroethylene (ETFE), polychlorotrifluoroethylene (PCTFE), polychlorotrifluoroethylene (PCTFE), polyvinylidene fluoride (PVDF), and polyvinyl fluoride (PVF).

The strength of the short fiber which constitutes the core part is preferably about 4.4 cN/dtex or less. The single-yarn fineness of the short or long fiber constituting the core part is preferably about 11 dtex or less. When the single-yarn fineness of the short or long fiber constituting the core part is within this range, the fishing line is not stiff or hard, and fibers do not come out of the sheath part.

In the fishing line of the present invention, single yarns of the short fiber which constitutes the core part may be independent, overlapped, or loosely bound and intertangled or intertwisted. The short fiber is preferably obtained by breaking a long fiber or a spun yarn.

The fishing line of the present invention is a composite yarn composed of a core part comprising a short fiber and a sheath part comprising preferably a synthetic long fiber, and preferably has a structure where fluff of the short fiber constituting the core part gets between or entangled with the long fibers and thereby the friction coefficient between the core and sheath layers is increased. In the fishing line of the present invention, it is preferred that the short fiber which constitutes the core part is intertangled with or enveloped by the long fiber which constitutes the sheath part, via the fluff of the short fiber. The short fiber in the core part may be bound with a binder to the extent that the objective of the present invention would not be impaired. By this treatment, the fluff condition of the short fiber can be adjusted, and a composite yarn with a smooth surface can be obtained. A publicly known binder may be used for convenience.

The outermost layer of the fishing line, composite yarn, or yarn of the present invention may be covered or coated with a resin, preferably an adhesive resin. Examples of the adhesive resin include acrylic resin, urethane resin, unsaturated polyester resin, epoxy resin, fluororesin, vinyl acetate resin, and polyolefin resin.

Next, a process for producing the fishing line of the present invention will be described. The fishing line of the present invention is preferably produced by, for example, the following method (A), (B), or (C).
(A) A production method comprising producing a composite yarn with use of a long fiber for the sheath part and another long fiber for the core part, the melting point of the long fiber for the core part being higher than that of the long fiber for the sheath part, and drawing the composite yarn under heating to break the long fiber in the core part into short fiber pieces without breaking the long fiber in the sheath part. (In this case, the strength of the fiber for the core part is preferably lower than that of the long fiber for the sheath part.)
(B) A production method comprising producing a composite yarn with use of a long fiber for the sheath part and another long fiber for the core part, the strength of the long fiber for the core part being lower than that of the long fiber for the sheath part, and drawing the composite yarn under heating or without heating to break the long fiber in the core part into short fiber pieces without breaking the long fiber in the sheath part.
(C) A production method comprising producing a composite yarn with use of a long fiber for the sheath part and a spun yarn comprising a short fiber or staple for the core part, the melting point of the short fiber or staple being higher than that of the long fiber for the sheath part, and drawing the composite yarn under heating or without heating to break the long fiber or the spun yarn into short fiber pieces without breaking the long fiber in the sheath part.

The composite yarn is produced by winding a long fiber around the core part constituted by a core yarn to cover the core yarn with the long fiber, or braiding long fibers around the core part constituted by a core yarn. The core yarn is the above-mentioned long fiber or spun yarn. In the case of a braided yarn, the braiding angle is preferably about 5° to 90°, more preferably about 5° to 50°, and more preferably about 20° to 30°. The method for braiding long fibers is not particularly limited, but usually a braiding machine is used. The number of long fibers used for braiding is not limited to 4 and in some cases may be 8, 12 or 16. The braiding may be round braiding or square braiding.

A composite yarn composed of a core part comprising a short fiber and a sheath part comprising a synthetic fiber filament yarn is drawn under heating or without heating, to give an integrated yarn where fluff of the short fiber is entangled with the filament so that the binding between the core and sheath layers is strengthened and that the strength of the long fiber in the sheath part is improved. Drawing under heating is preferred. As a drawing temperature, a temperature between the orientation temperature of the synthetic resin which constitutes the long fiber and about the melting point of the resin is adopted, depending on the material of the long fiber. When the sheath part is constituted by a long fiber comprising two or more kinds of synthetic resins, the drawing temperature is suitably selected by experiment. Therefore, the drawing temperature cannot be simply mentioned, but the temperature of the long fiber in drawing is usually about 120 to 300° C., more preferably about 130 to 200° C., and most preferably about 130 to 170° C. The drawing rate varies with the types of the short fiber and the long fiber, and the composition ratio in the composite yarn, but is about 1.05 to 10, preferably about 1.2 to 8, and most preferably about 1.3 to 5. The drawing rate is the ratio of the take-over speed to the feed speed of the yarn in drawing as represented by the following formula.

drawing rate=(take-over speed)/(feed speed).

The drawing may be performed in one step or two or more steps. Before drawing a composite yarn, an oil agent is provided to the yarn. The method is not particularly limited, and publicly known methods may be employed.

When the composite yarn is composed of a core part made of a spun yarn and a sheath part made of a synthetic long fiber, drawing treatment increases the tensile strength of the filament constituting the sheath part and strengthens the entanglement between the core and sheath layers, giving a strong yarn excellent in abrasion resistance. In drawing a composite yarn of which the core part comprises a staple yarn, when a drawing rate is higher than a certain value as described above, the staple yarn in the core part is partially and irregularly broken to form a cotton-like material, giving a yarn excellent in bendability and flexibility.

According to the production method of the present invention, even when a composite yarn composed of a core part comprising a short fiber and a sheath part comprising a synthetic fiber filament yarn does not comprise any adhesive resin, an integrated yarn excellent in bendability, flexibility, and abrasion resistance can be obtained. A fishing line made of the yarn has effects of resistance to kink, torsion, curliness in a reel, and thread jamming on a spool. Furthermore, the yarn, of which the surface is not sticky, has beneficial effects of being free from sticking together in a reel or on a bobbin when used as a fishing line. However, if needed, the periphery of the yarn of the present invention may be coated with an adhesive resin to the extent that the objective of the present invention would not be impaired. Coating the periphery of a yarn with an adhesive resin increases the strength of the yarn and at the same time fills gaps on the yarn surface to provide the fishing line with a smooth surface.

The fishing line or composite yarn of the present invention may be immersed in a bath of an emulsion, dispersion, or solution of an adhesive resin, squeezed between nip rollers to remove excess adhesive resin, and then dried so that the periphery (outermost layer) gets covered with the adhesive resin. The periphery of the composite yarn may be coated with the adhesive resin first and subsequently subjected to a drawing step. Examples of the adhesive resin include, as described above, acrylic resin, urethane resin, unsaturated polyester resin, epoxy resin, fluororesin, and vinyl acetate resin.

In the present invention, the short fiber, the filament (long fiber), the adhesive resin, and the like may additionally contain a colorant, a stabilizer, a plasticizer, a thickener, a lubricant or the like, or two or more thereof, to the extent that the objective of the present invention would not be impaired.

The yarn of the present invention may be used for any application where abrasion resistance, durability, weatherability, or water resistance is required. Specific examples of the application include various leisure goods, tools for fishery, such as a fishing line, a longline for tuna fishing, a rope, a gut, a kite string, a yarn for removing weeds, a surgical suture, etc.

EXAMPLES

Hereinafter, the invention will be described by referring to the examples below. The tensile strength in the Examples was determined by a method according to JIS L 1013 "Testing methods for man-made filament yarns" with a Strograph R tensile strength tester manufactured by Toyo Seiki Seisaku-Sho, Ltd. The break elongation was determined by a method according to JIS L 1013 "Testing methods for man-made filament yarns" with a universal testing machine "Autograph AG-100kNI" (manufactured by Shimadzu Corporation). The fineness was determined according to JIS L 1013, Section 7.3. To judge the break status of the core yarn, the entire yarn was cut at right angle to the longitudinal direction, the core yarn was pulled out from a cut surface, and whether a short piece of the core yarn was obtained or not was observed. In the tables, "Good" means that not the entire core yarn but short pieces of the core yarn were pulled out (from a cut surface) with some resistance, whereas "Poor" means that the entire core yarn was easily pulled out in an unbroken state and that the core and the sheath was easily separated.

Example 1

Around a 66-d spun yarn made of a polyester staple (trade name: Ester Spun Yarn E100FBN80/1C, manufactured by Unitika Fiber Co., Ltd.) as a core yarn, eight 75-d filaments made of an ultra high molecular weight polyethylene fiber (trade name: Dyneema SK71 85T-70-410, manufactured by TOYOBO Co., Ltd.) were round braided into an 826-dtex yarn. The obtained yarn was separately drawn at a drawing rate of 1.0, 1.3, 1.5, or 1.8 at a drawing temperature of 140° C. In each case, the fineness, straight line strength, straight line break elongation, knot strength, knot break elongation, and specific gravity of the obtained yarn; and the break status of the core yarn are shown in Table 1.

TABLE 1

| Drawing rate | 1.0 | 1.3 | 1.5 | 1.8 |
|---|---|---|---|---|
| Fineness (dtex) | 826 | 637 | 558 | 461 |
| Break status | Good | Good | Good | Good |
| Straight line strength (N) | 195.24 | 188.97 | 162.79 | 112.58 |
| Straight line break elongation (%) | 6.8 | 5.0 | 3.9 | 3.1 |
| Knot strength (N) | 65.11 | 60.11 | 58.06 | 48.54 |
| Knot break elongation (%) | 4.2 | 3.1 | 2.2 | 1.7 |
| Specific gravity | 1.01 | 1.01 | 1.01 | 1.01 |

As Table 1 clearly shows, at any drawing rate, the core yarn was broken.

Example 2

Around a 630-d glass bulky yarn (trade name: TDE70, manufactured by Unitika Glass Fiber Co., Ltd.) as a core yarn, eight 200-d filaments made of an ultra high molecular weight polyethylene fiber (trade name: Dyneema SK71 220T-192-410, manufactured by TOYOBO Co., Ltd.) were round braided into a 2796-dtex yarn. The obtained yarn was separately drawn at a drawing rate of 1.0, 1.2, 1.7, or 2.0 at a drawing temperature of 140° C. In each case, the fineness, straight line strength, straight line break elongation, knot strength, knot break elongation, and specific gravity of the obtained yarn; and the break status of the core yarn are shown in Table 2.

TABLE 2

| Drawing rate | 1.0 | 1.2 | 1.7 | 2.0 |
|---|---|---|---|---|
| Fineness (dtex) | 2796 | 2457 | 1717 | 1477 |
| Break status | Good | Good | Good | Good |

TABLE 2-continued

| | | | | |
|---|---|---|---|---|
| Straight line strength (N) | 258.11 | 290.18 | 259.39 | 218.69 |
| Straight line break elongation (%) | 8.7 | 5.1 | 3.5 | 2.8 |
| Knot strength (N) | 132.49 | 147.10 | 117.29 | 90.52 |
| Knot break elongation (%) | 6.8 | 4.6 | 2.6 | 2.0 |
| Specific gravity | 1.17 | 1.17 | 1.17 | 1.17 |

As Table 2 clearly shows, at any drawing rate, the core yarn was broken.

Example 3

Around a 203-d glass filament yarn (trade name: Glass YarnD450 ½ 4.4S, manufactured by Unitika Glass Fiber Co., Ltd.) as a core yarn, eight 200-d filaments made of an ultra high molecular weight polyethylene fiber (trade name: Dyneema SK71 220T-192-410, manufactured by TOYOBO Co., Ltd.) were round braided into a 2355-dtex yarn. The obtained yarn was separately drawn at a drawing rate of 1.0, 1.3, 1.5, or 1.8 at a drawing temperature of 140° C. In each case, the fineness, straight line strength, straight line break elongation, knot strength, knot break elongation, and specific gravity of the obtained yarn; and the break status of the core yarn are shown in Table 3.

TABLE 3

| | | | | |
|---|---|---|---|---|
| Drawing rate | 1.0 | 1.3 | 1.5 | 1.8 |
| Fineness (dtex) | 2355 | 1859 | 1653 | 1341 |
| Break status | Poor | Good | Good | Good |
| Straight line strength (N) | 410.03 | 362.06 | 357.94 | 275.17 |
| Straight line break elongation (%) | 4.8 | 3.8 | 3.1 | 2.8 |
| Knot strength (N) | 132.59 | 88.26 | 100.42 | 100.22 |
| Knot break elongation (%) | 3.2 | 2.8 | 2.5 | 2.6 |
| Specific gravity | 1.05 | 1.05 | 1.05 | 1.05 |

As Table 3 clearly shows, in the case where a glass yarn (long fiber) was used as a core yarn and a long fiber was used for braiding as a sheath part, the core yarn was not broken at a drawing rate of 1.0, and broken when drawn at a rate of 1.3 or more.

The yarn drawn at 1.5 had a higher knot strength, despite the lower fineness, than the yarn drawn at 1.3. The reason is considered to be that the glass yarn in the core part was drawn at a higher rate and favorably broken.

Example 4

Around a 396-d fluororesin filament (trade name: Hastex FEP440dT/48f, manufactured by TOYO POLYMER Co., Ltd.) as a core yarn, eight 100-d filaments made of an ultra high molecular weight polyethylene fiber (trade name: Dyneema SK71 110T-96-410, manufactured by TOYOBO Co., Ltd.) were round braided into a 1420-dtex yarn. The obtained yarn was separately drawn at a drawing rate of 1.0, 1.3, 1.5, or 1.8 at a drawing temperature of 140° C. In each case, the fineness, straight line strength, straight line break elongation, knot strength, knot break elongation, and specific gravity of the obtained yarn; and the break status of the core yarn are shown in Table 4.

TABLE 4

| | | | | |
|---|---|---|---|---|
| Drawing rate | 1.0 | 1.3 | 1.5 | 1.8 |
| Fineness (dtex) | 1420 | 1102 | 938 | 778 |
| Break status | Poor | Good | Good | Good |
| Straight line strength (N) | 219.67 | 193.12 | 167.37 | 139.47 |
| Straight line break elongation (%) | 6.3 | 3.9 | 3.1 | 3.0 |

TABLE 4-continued

| | | | | |
|---|---|---|---|---|
| Knot strength (N) | 70.29 | 61.79 | 59.72 | 46.04 |
| Knot break elongation (%) | 3.2 | 2.8 | 2.1 | 1.9 |
| Specific gravity | 1.18 | 1.18 | 1.18 | 1.18 |

The invention claimed is:

1. A fishing line comprising a composite yarn having a long fiber in a sheath part and a short fiber which is not twisted in a core part, which is produced by a drawing treatment under heating or without heating at a drawing rate of 1.3 or more,
    wherein the short fiber which constitutes the core part consists of a plurality of fluororesin fibers, the fluororesin fibers are sequentially arranged in a longitudinal direction inside the sheath part, and the short fiber is continuous inside the sheath part,
    wherein fluff of the short fiber of the core part gets between or entangled with the long fiber, thereby increasing the friction coefficient between the core part and the sheath part,
    wherein an adhesive or binder is not applied to the short fiber of the core part and the long fiber of the sheath part,
    wherein the short fiber of the core part is partially and irregularly broken to form a cotton-like material,
    wherein the long fiber of the sheath part is braided around the core part,
    wherein the long fiber in the sheath part comprises an ultra high molecular weight polyethylene fiber having a molecular weight of 300,000 or more,
    wherein a melting point of the fiber for the core part is higher than that of the fiber for the sheath part, and
    wherein a straight line elongation of the yarn at break is 3.9% or less.

2. The fishing line according to claim 1, wherein the fluororesin fibers of the short fiber in the core part are overlapped, or intertangled.

3. The fishing line according to claim 1, wherein a fiber length of the short fiber in the core part is 5to 500mm.

4. The fishing line according to claim 1, wherein a specific gravity of the short fiber in the core part is 1.0or more.

5. The fishing line according to claim 1, wherein the short fiber in the core part is used for adjusting a specific gravity of the fishing line.

6. The fishing line according to claim 1, wherein the long fiber in the sheath part comprises an ultra high molecular weight polyethylene fiber having a molecular weight of 300,000 or more, which accounts for 12% by weight or more of the whole composite yarn.

7. The fishing line according to claim 1, comprising a staple.

8. A fishing line comprising a composite yarn having a long fiber in a sheath part and a short fiber in a core part, which is produced by a drawing treatment under heating or without heating at a drawing rate of 1.3 or more,
    wherein the short fiber which constitutes the core part consists of a plurality of fluororesin fibers, the fluororesin fibers are sequentially arranged in a longitudinal direction inside the sheath part, and the short fiber is continuous inside the sheath part,
    wherein fluff of the short fiber of the core part gets between or entangled with the long fiber, thereby increasing the friction coefficient between the core part and the sheath part, wherein an adhesive or binder is not applied to the short fiber of the core part and the long fiber of the sheath part, wherein the short fiber of the core part is partially and irregularly broken to form a cotton-like material, wherein the long fiber of the sheath part is braided around the core part, wherein the plurality of single fluororesin fibers of the short fiber of the core part are not intertwisted, wherein the long fiber in the sheath part comprises an ultra high molecular weight polyethylene fiber having a molecular weight of 300,000 or more, wherein a melting point of the fiber for the core part is higher than that of the fiber for the sheath part, and wherein a straight line elongation of the yarn at break is 3.9% or less.

9. The fishing line according to claim 1, wherein the long fiber in the sheath part is twisted, and has a twist coefficient K of 0.4 to 0.8.

10. The fishing line according to claim 1, wherein the long fiber of the sheath part comprises twisted filaments, which are braided, and has a braiding angle of 5° to 90°.

* * * * *